(12) United States Patent
Åström

(10) Patent No.: US 12,302,153 B2
(45) Date of Patent: May 13, 2025

(54) TECHNIQUE FOR PERFORMING NEIGHBOR CELL MEASUREMENTS

(71) Applicant: Telefonaktiebolaget LM Ericsson (publ), Stockholm (SE)

(72) Inventor: Magnus Åström, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 56 days.

(21) Appl. No.: 17/769,414

(22) PCT Filed: Nov. 6, 2020

(86) PCT No.: PCT/EP2020/081369
§ 371 (c)(1),
(2) Date: Apr. 15, 2022

(87) PCT Pub. No.: WO2021/089833
PCT Pub. Date: May 14, 2021

(65) Prior Publication Data
US 2024/0137792 A1    Apr. 25, 2024

Related U.S. Application Data

(60) Provisional application No. 62/933,177, filed on Nov. 8, 2019.

(51) Int. Cl.
*H04W 24/10* (2009.01)
*H04W 8/00* (2009.01)
(Continued)

(52) U.S. Cl.
CPC ............ *H04W 24/10* (2013.01); *H04W 8/005* (2013.01); *H04W 56/0015* (2013.01); *H04W 76/20* (2018.02)

(58) Field of Classification Search
CPC . H04W 24/10; H04W 8/005; H04W 56/0015; H04W 76/20; H04W 56/0045;
(Continued)

(56) References Cited

U.S. PATENT DOCUMENTS 8,811,990 B2    8/2014  Jeong et al.
8,989,736 B2    3/2015  Wang et al.
(Continued)

FOREIGN PATENT DOCUMENTS

CN    101689923 A    3/2010
CN    103621138 A    3/2014
(Continued)

OTHER PUBLICATIONS

Sony, "Summary of the use of RSS for measurement improvements", R1-1910542, Oct. 14-20, 2019. (From Applicant's IDS) (Year: 2019).*
(Continued)

*Primary Examiner* — Mang Hang Yeung
(74) *Attorney, Agent, or Firm* — COATS & BENNETT, PLLC

(57) ABSTRACT

A technique for performing neighbor cell measurements for one or more cells of a cellular radio access network, RAN, is provided. As to a method aspect, a method (200) comprises or triggers a step of detecting (202) at least two neighbor cells of the RAN, wherein at least one of the detected neighbor cells is in a neighbor cell list, NCL, of the RAN, and wherein at least one of the detected neighbor cells Is not in the NCL of the RAN. The method (200) further comprises a step of measuring (204), for each of one or more of the detected cells of the RAN, a measurement signal (300) from the respective cell. The method (200) still further comprises a step of estimating (206), for each of the one or more of the detected cells of the RAN, a radio signal value
(Continued)

based on the measured measurement signal (300) from the respective cell.

16 Claims, 6 Drawing Sheets

(51) Int. Cl.
*H04W 56/00* (2009.01)
*H04W 76/20* (2018.01)

(58) Field of Classification Search
CPC ............ H04W 36/0094; H04B 17/346; H04B 17/309; H04B 17/318; H04L 5/0048
USPC ......................................................... 370/329
See application file for complete search history.

(56) References Cited

U.S. PATENT DOCUMENTS

| | | | |
|---|---|---|---|
| 9,674,719 | B2 | 6/2017 | You et al. |
| 9,992,695 | B2 | 6/2018 | Axmon et al. |
| 11,297,519 | B2 | 4/2022 | Kubota et al. |
| 2009/0011757 | A1 | 1/2009 | Tenny |
| 2013/0137454 | A1* | 5/2013 | Cui .......................... G01S 5/021 455/456.1 |
| 2013/0182583 | A1 | 7/2013 | Siomina et al. |
| 2023/0217328 | A1* | 7/2023 | Wong ................ H04W 56/0015 370/331 |

FOREIGN PATENT DOCUMENTS

| | | |
|---|---|---|
| CN | 104509166 A | 4/2015 |
| CN | 106233646 A | 12/2016 |
| CN | 109417747 A | 3/2019 |
| EP | 2523500 A1 | 11/2012 |
| WO | 2010062238 A1 | 6/2010 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.7.0, Sep. 1, 2019, pp. 1-962, 3GPP.

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 15)", Technical Specification, 3GPP TS 36.304 V15.4.0, Jun. 1, 2019, pp. 1-55, 3GPP.

3rd Generation Partnership Project, "3rd Generation Partnership Project; Technical Specification Group Radio Access Network; Evolved Universal Terrestrial Radio Access (E-UTRA); Physical layer procedures (Release 15)", Technical Specification, 3GPP TS 36.213 V15.7.0, Sep. 1, 2019, pp. 1-551, 3GPP.

3rd Generation Partnership Project, "3rd Generation Partnership Project; Technical Specification Group Radio Access Network; Evolved Universal Terrestrial Radio Access (E-UTRA); Physical channels and modulation (Release 15)", Technical Specification, 3GPP TS 36.211 V15.7.0, Sep. 1, 2019, pp. 1-239, 3GPP.

Sony, "Follow Up Summary of the use of RSS for measurement improvements", 3GPP TSG RAN WG1 #98bis, Chongqing, China, Oct. 14, 2019, pp. 1-8, R1-1911388, 3GPP.

Sony, "Summary of the use of RSS for measurement improvements", 3GPP TSG RAN WG1 #98bis, Chongqing, China, Oct. 14, 2019, pp. 1-13, R1-1910542, 3GPP.

Ericsson, "Revised WID: Additional MTC enhancements for LTE", 3GPP TSG RAN Meeting #84, Newport Beach, USA, Jun. 3, 2019, pp. 1-5, RP-191356, 3GPP.

Qualcomm Incorporated, "Measurements based on RSS", 3GPP TSG RAN WG1 #98bis, Chongqing, China, Oct. 14, 2019, pp. 1-4, R1-1911356, 3GPP.

WI Rapportuer (Ericsson), "RAN1 agreements for Rel-16 Additional MTC Enhancements for LTE", 3GPP TSG-RAN WG1 Meeting #98bis, Chongqing, China, Oct. 14, 2019, pp. 1-47, R1-1911573, 3GPP.

Ericsson, "Use of RSS for measurement improvements in LTE-MTC", 3GPP TG-RAN WG1 Meeting #98bis, Chongqing, China, Oct. 14, 2019, pp. 1-9, R1-1909994, 3GPP.

Huawei, HiSilicon, Deutsch Telekom, "Discussion on CSG cell measurement exclusion for inter-frequency detected set operation", 3GPP TSG-RAN WG2 (Discussion) #78, May 21-25, 2012, pp. 1-2, R2-122851, 3GPP, Prague, CZ.

\* cited by examiner

TECHNIQUE FOR PERFORMING NEIGHBOR CELL MEASUREMENTS

TECHNICAL FIELD

The present disclosure generally relates to neighbor cell measurements in a radio access network. More specifically, a method and a device are provided for performing neighbor cell measurements for one or more cells of a cellular radio access network.

BACKGROUND

The 3rd Generation Partnership Project (3GPP) has specified means for controlling and increasing coverage for enhanced Machine Type Communication (eMTC) and Narrowband Internet of Things (NB-IoT). For example, a cellular radio access networks (RAN) providing cell coverage for eMTC and/or NB-IoT controls the coverage by a maximum number of repetitions, $R_{max}$, used for transmitting a message in downlink (DL) channels, e.g., in an MTC physical downlink control channel (MPDCCH), a Physical Downlink Shared Channel (PDSCH), a NB physical downlink control channel (NPDCCH) or a NB Physical Downlink Shared Channel (NPDSCH). The $R_{max}$ values may be defined in values from 1 to 2048, wherein the next value is a doubling of the previous one. The coverage of a specific number of repetitions, R, is not only dependent on $R_{max}$, but also on a size of the message, since a longer message typically requires a higher R compared to a shorter, e.g., provided the same coverage. Paging messages using the xPDCCH (MPDCCH for eMTC and NPDCCH for NB-IoT) are typically the same size (not the same number of repetitions of that message, though) for a given cell, providing a constant maximum coverage.

Radio measurements done by a radio device in the RAN (e.g., by a user equipment, UE) are typically performed on a serving cell of the radio device as well as on neighbor cells (e.g. NB cells, NB physical resource block (PRB), etc.) over some known reference symbols or pilot sequences, e.g. cell-specific reference signals (CRS) for NB-IoT (NB-CRS) or a secondary synchronization signals (SSS) and a primary synchronization signal for NB-IoT (NB-SSS and NB-PSS, respectively), etc.

The measurements are done on cells on an intra-frequency carrier, one or more inter-frequency carriers and/or on one or more inter-RAT carriers (e.g., depending upon the UE capability whether it supports that RAT). To enable inter-frequency and inter-RAT measurements for the UE requiring gaps, the network has to configure the measurement gaps.

A particularly powerful means for increasing the coverage is the resynchronization signal (RSS). However, using the RSS for estimating a radio signal quality may mislead an automatic neighbor relation function, a cell selection or mobility decision, because different neighbor cells may use different transmit powers specifically for the RSS. Furthermore, comparing the radio signal quality based on different types of measurement signals, such as RSS and CRS, using different transmit powers may be misleading, e.g., to the UE or the RAN.

SUMMARY

Accordingly, there is a need for a technique that allows neighbor cell measurements based on different types of measurements signals, preferably a n RSS and/or CRS. An alternative or more specific object is to enable neighbor cell measurements even if the transmit power of measurement signals is not known, e.g., not known at the UE or a serving cell of the UE.

As to a method aspect, a method of performing neighbor cell measurements for one or more cells of a cellular radio access network (RAN) is provided. The method comprises or triggers the step of detecting at least two neighbor cells of the RAN. The method further comprises or triggers the step of measuring, for each of one or more of the detected cells of the RAN, a measurement signal from the respective cell. The method further comprises or triggers the step of estimating, for each of the one or more of the detected cells of the RAN, a radio signal value based on the measured measurement signal from the respective cell.

Herein, any of the cells may be implemented by a radio base station providing radio access in a coverage area of the cell.

Herein, measuring a measurement signal may encompass measuring an energy of the measurement signal. Particularly, measuring a measurement signal may encompass measuring an energy of the measurement signal per resource element.

Alternatively or in addition, measuring a measurement signal may encompass measuring a signal-to-noise ratio (SNR) and/or a signal-to-interference-and-noise ratio (SINR) of the measurement signal. Particularly, measuring a measurement signal may encompass measuring a SNR and/or a SINR of the measurement signal per resource element.

The RAN may comprise cells operating on different carrier frequencies and/or using different radio access technologies (RATs). The measurement may be an intra-frequency measurement, an inter-frequency measurement and/or an inter-RAT measurement.

The method may be performed by a radio device of the RAN. The measuring step may further comprise measuring a measurement signal from a serving cell of the radio device. Alternatively or in addition, the at least two detected neighbor cells may be neighbor cells relative to at least one of the radio device and the serving cell.

Any neighbor cell may also be referred to as a neighboring cell.

By estimating the radio signal value (e.g., a corrected reference signal received power for the respective neighbor cell) based on the measurement (e.g., a received power of the respective measurement signal), different transmit powers may be compensated.

Preferably, at least two neighbor cells are detected and the measurement signals from each of the at least two detected neighbor cells are measured, wherein at least one of the detected cells is in a neighbor cell list (NCL) and at least one other of the detected cells is not in the NCL. The step of estimating the radio signal value may compensate for a power bias in the transmit power of measurement signals from neighbor cells. For example the transmit power may be biased (i.e., different) according to the power bias between one or more cells in the NCL and one or more cells not in the NCL.

At least some embodiments of the technique may allow performing neighbor cell measurements for cells with and without a NCL. Same or further embodiments may allow performing neighbor cell measurements for cells in the NCL as well as cells not in the NCL.

A transmit power of the measurement signal from at least one of the detected neighbor cells may involve a power bias. Estimating the radio signal value based on the respective measurement signal for the respective cell may comprise compensating the power bias.

Compensating may comprise correcting or adjusting the radio signal value relative to a received power or received energy of the respective measurement signal may be based received information (e.g., a control message) from the RAN and/or an assumption (e.g., assuming a value for a configuration parameter that is an average over two or all possible values of the configuration parameter).

Herein, the power bias may be a bias (e.g., a difference or a deviation) in the transmit power of the respective measurement signal from the respective one of the at least one neighbor cell in the measuring step, e.g., compared to the transmit power of the measurement signal from the serving cell or the transmit power of the measurement signal from another neighbor cell.

The respective measurement signal from each of at least two of the detected neighbor cells may be measured. Estimating the radio signal value based on the respective measurement signal for each of the at least two cells may comprise compensating a power bias in transmit powers of the respective measurement signals.

The transmit power of the respective measurement signal may be defined as the linear average over the power contributions (e.g., in Watt) of all resource elements that carry the respective measurement signal (e.g., within the operating bandwidth). Alternatively or in addition, the transmit power of the measurement signal may be defined as the energy per resource element (EPRE) of the respective measurement signal.

The method may further comprise a step of receiving a power bias control message from the RAN, the power bias control message being indicative of the power bias.

The power bias control message may be implemented by any signaling from the RAN, e.g., from a serving cell. The power bias control message may be implemented by dedicated signaling or broadcasted signaling. For example, system information (SI) may comprise or implement the power bias control message, and/or the power bias control message may be a radio resource control (RRC) message.

At least one of the detected neighbor cells may be excluded from the measuring step and/or the estimating step, if the at least one excluded cell uses a power bias for transmitting its measurement signals or if the at least one excluded cell uses an unknown power bias.

The power bias may be unknown to a radio device performing the method.

The method may further comprise a step of receiving a control message from the RAN. The control message may be indicative of a power bias for at least one neighbor cell, optionally for at least one of the detected neighbor cells. At least one of the detected neighbor cells may be excluded from the measuring step and/or the estimating step, if the at least one excluded cell uses a power bias for transmitting its measurement signals and the control message is not indicative of the power bias for the at least one excluded cell.

The power bias may relate to or may be caused by a boost in the transmit power of the respective measurement signal and/or by a number of reference signal (RS) ports of the respective measurement signal.

The number of the RS ports may be a number of cell-specific RS (CRS) ports.

The method may be performed by a radio device configured for radio access to the RAN.

A serving cell of the RAN may provide radio access to the radio device.

The method may further comprise or trigger a step of transmitting a report to the RAN. The report may be indicative of the radio signal value estimated for each of the one or more of the detected cells of the RAN.

The report may be transmitted to the serving cell.

The measurement signal may comprise a synchronization signal (SS) and/or a RS.

The measurement signal may comprise a CRS and/or a demodulation RS (DMRS).

The measurement signal may comprise a primary synchronization signal (PSS) and/or a secondary synchronization signal (SSS) and/or a resynchronization signal (RSS).

At least one of the detected neighbor cells may be in a NCL of the RAN.

The NCL may be provided by the serving cell, e.g., to handle or control neighbor cell measurements, e.g. intra-frequency measurements and/or inter-frequency measurements.

Estimating, for at least one or each of the detected neighbor cells in the NCL, the radio signal value based on the respective measurement signal may comprise compensating a power bias indicated in the NCL for the respective cell and/or the respective measurement signal.

At least one of the detected neighbor cells may not or need not be in the NCL of the RAN.

At least one or each of the detected neighbor cells not in the NCL may be excluded from the measuring step and/or the estimating step.

The method may further comprise or trigger a step of receiving an NCL control message from the RAN. The NCL control message may be indicative of whether to exclude or to include the detected neighbor cells not in the NCL in the measuring step and/or in the estimating step.

The NCL control message may be implemented by any signaling from the RAN, e.g., from a serving cell. The NCL control message may be implemented by dedicated signaling or broadcasted signaling. For example, system information (SI) may comprise or implement the NCL control message, and/or the NCL control message may be a radio resource control (RRC) message.

SI from the RAN may comprise the NCL control message.

The excluding may be specific for one or more types of the measurement signal, preferably specific for the RSS as the measurement signal.

The excluding (or exclusion) may apply (e.g., only) to one or more types of the measurement signal, e.g. only to the RSS. For example, a measurement signal of the specific type from the one or more detected neighbor cells not in the NCL is not measured in the measuring step and/or is not used in the estimating step.

The measurement signals may comprise a first type of measurement signal and a second type of measurement signal other than the first type. The measuring step and/or the estimating step may not or need not be performed for the first type of measurement signal from the detected neighbor cells not in the NCL. The measuring step and/or the estimating step may be performed for the second type of measurement signal from the detected neighbor cells not in the NCL.

The measuring step and the estimating step may be performed for both the first type and the second type of measurement signal from the detected neighbor cells in the NCL.

The first type of measurement signal may comprise the RSS. Alternatively or in addition, the second type of measurement signal may comprise at least one of the PSS, the SSS, the CRS, and the DMRS.

The detecting of each of the at least two neighbor cells may comprise establishing a downlink synchronization with the respective cell and/or determining an identifier of the respective cell.

The measurement signal may be measured based on the established downlink synchronization. Alternatively or in addition, the report may be indicative of the respective radio signal value in conjunction with the determined identifier of the respective cell.

Establishing the downlink synchronization with the respective cell and/or determining the identifier of the respective cell may be based on synchronization signals, preferably the PSS and the SSS, received prior to measuring the measurement signal.

Herein, the PSS and/or the SSS may be a narrowband PSS (NB-PSS) and/or a narrowband SSS (NB-SSS), respectively.

The identifier of the respective cell may be a physical cell identifier (PCI).

Determining the identifier of the respective cell may also be referred to as cell search or cell identification.

Measuring the measurement signal may comprise measuring received energy or received power of the measurement signal.

Alternatively or in addition, measuring the measurement signal may comprise measuring a SNR and/or SINR of the measurement signal.

The radio signal value may be indicative of a radio signal strength of the respective cell and/or a radio signal attenuation of the respective cell and/or a radio signal quality of the respective cell.

The radio signal value may be or may be indicative of or may comprise a reference signal received power (RSRP) for the respective cell and/or a reference signal received quality (RSRQ) for the respective cell.

The method may be performed in a radio device wireless connected or connectable to the RAN. Optionally, the method may be performed in a radio resource control (RRC) connected state and/or an RRC idle state.

Herein, performing measurements "for" any of the cells may also be referred to as performing measurements "on" the respective cells.

The measuring may be performed for at least one detected cell that is included in a NCL and at least one other detected cell that is not included in the NCL.

The detecting may comprise a step of detecting a set of at least two neighbor cells. The detecting may further comprise a step of identifying the at least one cell in the set of detected neighbor cells, which is in the NCL. The detecting may still further comprise a step of identifying the at least one other cell in the set of detected neighbor cells, which is not in the NCL.

The estimating of the respective radio signal values may be based on the performed measurements for the respective cells.

The estimating may comprise a step of estimating or adjusting the respective radio signal value for the at least one cell in the NCL relative to a result of measuring the respective cell according to a bias value signaled in the NCL.

The estimating may comprise a step of estimating or adjusting the respective radio signal value for the at least one cell not in the NCL based on SI and/or data from a serving cell, preferably a priori serving cell data.

Estimating or adjusting the respective radio signal value for the at least one cell not in the NCL based on data from the serving cell and/or the a priori serving cell data may comprise compensating a power bias in a transmit power, wherein the power bias is assumed and/or set to be equal to the power bias of the serving cell.

The estimating may comprise a step of estimating or adjusting the respective radio signal value for the at least one cell not in the NCL according to an average.

Herein, a result of measuring the respective measurement signal may comprise at least one of a measured or received signal strength of the respective measurement signal, a measured or received signal power of the respective measurement signal and a measured or received signal energy of the respective measurement signal.

The respective radio signal value may be the average, which may be computed over evaluations of the result of measuring the respective measurement signal. Alternatively or in addition, the respective radio signal value may be evaluated using an average for a cell configuration.

The respective radio signal value may be estimated or adjusted by evaluating the result of measuring the respective measuring signal for each of at least two different hypotheses as to a cell configuration and computing the average of the at least two results of the evaluating.

The respective radio signal value may be estimated or adjusted by computing an average of a configuration parameter over at least two different hypotheses as to a cell configuration and evaluating the result of the measuring of the respective measuring signal using the average of the configuration parameter.

The average may be at least one of an average of the number of CRS ports, a CRS power boosting average, a RSS power boosting average. The average number of CRS ports may be based on a signal value (e.g., SI and/or a signal from the RAN) indicative of a set of the number of CRS ports.

The different hypotheses as to the cell configuration may differ in at least one of a number of CRS ports, a CRS power boosting, a RSS power boosting, and a signal value indicative of a set of the CRS ports.

The configuration parameter may comprise at least one of a number of CRS ports, CRS power boosting, RSS power boosting, and a signal value given a set of the number of CRS ports.

The different hypotheses may comprise a set of the number of CRS ports.

The set of the number of CRS ports may depend on SI from the RAN.

The signal PresenceAntennaPort1 received from the RAN may exclude the value 1 from the set of the number of CRS ports.

For cells in the NCL, a 3-bit indicator may define a RSS power bias relative to a Q_offset value used for CRS-based measurements. Optionally, for cells in the NCL, the RSS power bias may be relative to the Q_offset value is at least one of −6 dB; −3 dB; 0 dB; 3 dB; 6 dB; 9 dB; and 12 dB.

The technique may be implemented at one or more radio devices configured for radio access to the RAN. The RAN may serve the one or more radio devices. The method may be performed in different radio resource control (RRC) states of the radio device, e.g., in a connected state or an idle state.

The method may be performed by a radio device for the RAN. Each base station of the RAN may implement one or more cells of the RAN. Herein, a base station may encompass any station that is configured to provide radio access to the radio device. The base station of the RAN may serve a plurality of radio devices, e.g., each implementing the technique.

The radio device may be configured for peer-to-peer communication (e.g., on a sidelink) and/or for accessing the RAN (e.g. on an uplink and/or a downlink). The radio device may be a user equipment (UE, e.g., a 3GPP UE), a mobile or portable station (STA, e.g. a Wi-Fi STA), a device for machine-type communication (MTC), a device for narrow-band Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY). Alternatively or in addition, a Medium Access Control (MAC) layer, a Radio Link Control (RLC) layer and/or a Radio Resource Control (RRC) layer of a protocol stack for the radio access may implement or trigger one or more steps of the method.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to a device aspect, a device for performing neighbor cell measurements for one or more cells of a cellular RAN is provided. The device may be configured to perform the method aspect. Alternatively or in addition, the device comprises a detecting module or a detecting unit configured to detect at least two neighbor cells of the RAN. The device further comprises a measuring module or a measuring unit configured to measure, for each of one or more of the detected cells of the RAN, a measurement signal from the respective cell. The device further comprises an estimating unit or an estimating module configured to estimate, for each of the one or more of the detected cells of the RAN, a radio signal value based on the measured measurement signal from the respective cell.

As to a further device aspect, a device for performing neighbor cell measurements for one or more cells of a cellular RAN is provided. The device comprises at least one processor and a memory. Said memory may comprise instructions executable by said at least one processor whereby the device is operative to perform the method aspect.

As to a still further aspect, a user equipment (UE) configured to communicate with a base station is provided. The UE comprises a radio interface and processing circuitry configured to execute any one of the steps of the method aspect.

As to a still further aspect, a communication system including a host computer is provided. The host computer may comprise a processing circuitry configured to provide user data. The host computer may further comprise a communication interface configured to forward user data to a cellular network for transmission to a user equipment (UE), wherein the UE comprises a radio interface and processing circuitry, the processing circuitry of the UE being configured to execute any one of the steps of the method aspect.

The communication system may further include the UE. Alternatively or in addition, the cellular network may further include a base station configured to communicate with the UE.

The processing circuitry of the host computer may be configured to execute a host application, thereby providing the user data. Alternatively or in addition, the processing circuitry of the UE may be configured to execute a client application associated with the host application.

As to a still further aspect, a method implemented in a user equipment (UE) is provided. The method may comprise any one of the steps of the method aspect.

The device, the UE, the system or any node or station for embodying the technique may further include any feature disclosed in the context of the method aspect, and vice versa. Particularly, any one of the units and modules, or a dedicated unit or module, may be configured to perform or trigger one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 3GPP LTE implementation, it is readily apparent that the technique described herein may also be implemented in any other radio network, including New Radio (NR) or 5G or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
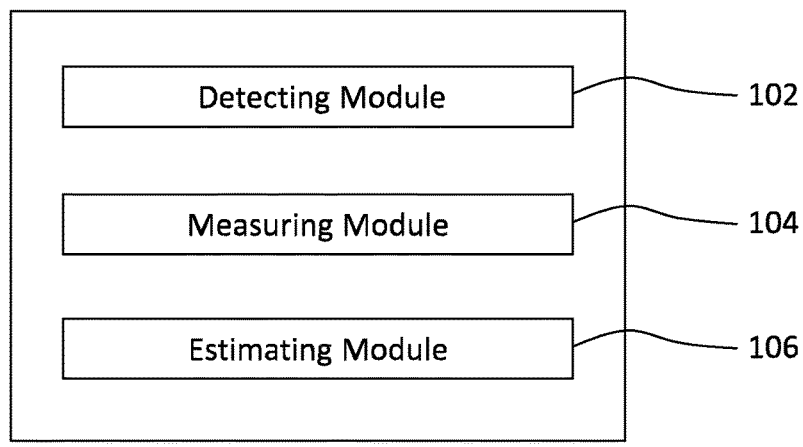
FIG. 1 shows a schematic block diagram of an embodiment of a device for performing neighbor cell measurements for one or more cells of a cellular RAN.

FIG. 1 schematically illustrates a block diagram of an embodiment of a device for performing neighbor cell measurements for one or more cells of a cellular radio access network (RAN). The device is generically referred to by reference sign 100.

The device 100 comprises a detecting module 102 that detects at least two neighbor cells of the RAN. The device 100 further comprises a measuring module 104 that measures, for each of one or more of the detected cells of the RAN, (e.g., received power or received energy of) a measurement signal from the respective cell. The device 100 further comprises an estimating module 106 that estimates, for each of the one or more of the detected cells of the RAN, a radio signal value based on the measured measurement signal from the respective cell.

Any of the modules of the device 100 may be implemented by units configured to provide the corresponding functionality.

Cells (e.g., a serving cell of the device 100 and/or the detected neighbor cells) may be part of the RAN. The cells may be embodied by or at a base station (also: radio base station or RBS) of the RAN, nodes connected to the RAN for controlling the base station or a combination thereof.

The device 100 may be a radio device, e.g., wirelessly connected or connectable to the RAN. The device 100 may be embodied by or at a radio device configured for accessing the RAN, for example in a vehicle configured for radio-connected driving or in a sensor or actuator.

The base station may encompass a network controller (e.g., a Wi-Fi access point) or a radio access node (e.g. a 3G Node B, a 4G eNodeB or a 5G gNodeB) of the RAN. The base station may be configured to provide radio access to one or more embodiments of the radio device 100. Alternatively or in addition, the one or more radio devices 100 may include a mobile or portable station or a radio device 100 connectable to the RAN. Each radio device 100 may be a user equipment (UE), a device for machine-type communication (MTC) and/or a device for (e.g., narrowband) Internet of Things (IoT). Optionally, two or more radio devices 100 may be configured to wirelessly connect to each other, e.g., in an ad hoc radio network or via 3GPP sidelinks.

Figure 2:
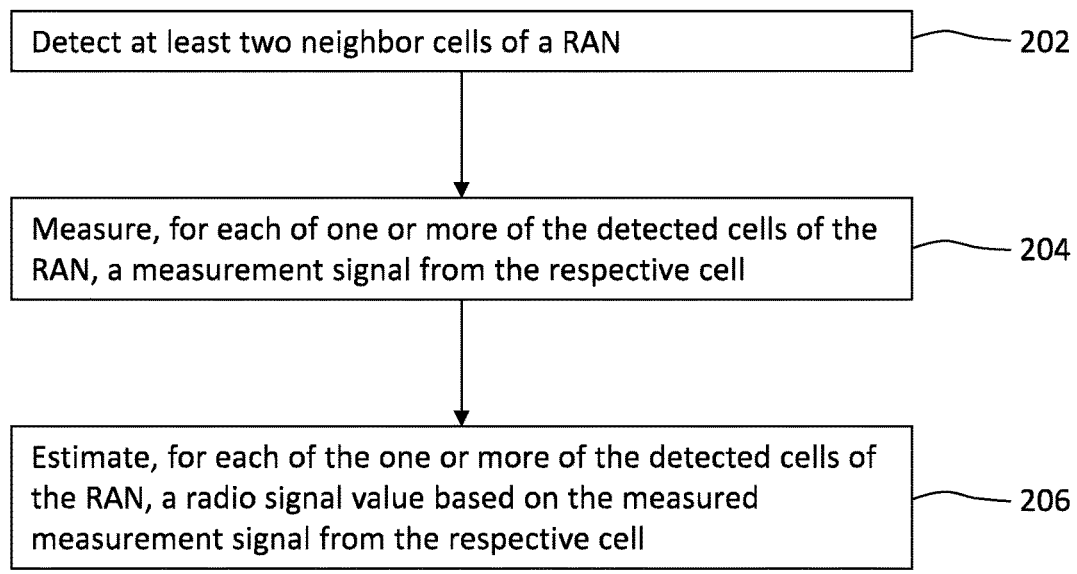
FIG. 2 shows a flowchart for a method embodiment for performing neighbor cell measurements for one or more cells of a cellular RAN, which method may be implementable by the device of FIG. 1.

FIG. 2 shows a flowchart for a method embodiment of a method 200 of performing neighbor cell measurements for one or more cells of a cellular RAN.

The method 200 comprises a step 202 of detecting at least two neighbor cells of the RAN. The method 200 further comprises a step 204 of measuring, for each of one or more of the detected cells of the RAN, a measurement signal from the respective cell. The method 200 further comprises a step 206 of estimating, for each of the one or more of the detected (optionally, and measured) neighbor cells, a radio signal value based on the measured measurement signal from the respective cell.

The method 200 may be performed by the device 100, e.g., at or using the radio device for accessing the RAN or another radio device. For example, the modules 102, 104 and 106 may perform the steps 202, 204 and 206, respectively.

Whereas at least some existing neighbor cell measurement techniques do not take into account neighbor cells that are not in a NCL, embodiments of the device 100 or method 200 can be able to perform neighbor cell measurement including one or more cells not in the NCL.

RSS and CRS neighbor cell measurements may differ substantially depending on a cell configuration of the respective neighbor cell, e.g., regarding a transmit power of the respective measurement signal.

For example, a CRS power boosting of the CRS and an RSS power boosting of the RSS may be different (e.g., for different cells or even for the same cell). Alternatively or in addition, a number of CRS ports may be different for different cells.

The step 206 of estimating the respective radio signal values based on these different measurement signals (also referred to as different types of measurement signals) and/or the respective radio signal values based on measurements of different cells may compensate for these differences. Hence, embodiments of the device 100 and the method 200 can accurately measure and/or compare signal power levels among neighbor cells, e.g., wherein some of the cells are included in the NCL while others are not.

The technique may be implemented as a method for comparing neighbor cell measurements among cells, wherein some of the detected cells are included in a NCL whereas other detected cells are not in the NCL.

Any embodiment of the method 200 may, in a step 202 detect the neighbor cells. Optionally, a set of cells in the NCL are identified together with a set of cells not in the NCL. In a step 204, measurements are performed on some or all of the detected cells, wherein both sets of cells are represented. In a step 206, a radio signal value (also: signal value) is estimated based on the measurements.

The neighbor cell measurement method 200 may be performed for various purposes. Some example measurement purposes include at least one of mobility, positioning, self-organizing network (SON), minimization of drive tests (MDT), operation and maintenance (O&M), network planning and optimization, etc. Examples of measurements in (e.g., in LTE) include at least one of Cell identification (also: PCI acquisition), Reference Signal Received Power (RSRP), Reference Signal Received Quality (RSRQ), cell global ID (CGI) acquisition, Reference Signal Time Difference (RSTD), UE RX-TX time difference measurement, Radio Link Monitoring (RLM), which may comprise of Out of Synchronization (out-of-sync) detection and In Synchronization (in-sync) detection etc. Channel State Information (CSI) measurements performed by the UE 100 may be used for at least one of scheduling and link adaptation, e.g., the RAN or the serving cell. Examples of CSI measurements or CSI reports include at least one of Channel Quality Indicator (CQI), Precoding Matrix Indicator (PMI), and a Rank Indicator (RI).

The measurements 204 may be performed on reference signals (RS) such as cell-specific RS (CRS), CSI-RS, demodulation RS (DMRS) as examples of the measurement signals. Alternatively or in addition, the measurements 204 may be performed on RSS.

In order to identify an unknown cell (e.g., new neighbor cell) in the detecting step 202, the UE 100 may acquire the timing of (also: establish synchronization with) that cell and eventually the physical cell identity or identifier (PCI). In legacy LTE operation, the DL subframe #0 (i.e., the first subframe in the radio frame) and subframe #5 (i.e., the sixth subframe in the radio frame) carry synchronization signals (i.e., both PSS and SSS). The synchronization signals used for NB-IoT are known as NB-PSS and NB-SSS, and their periodicity may be different from the LTE legacy synchronization signals. In total there are 504 PCIs in NB-IoT RAT.

The step 202 may also be referred to as cell search or cell identification.

Subsequently, the UE 100 also measures an RSRP and/or RSRQ of the newly identified cell in the step 204 and estimates a radio signal value (e.g., a corrected RSRP and/or RSRQ), e.g. in order to use for itself and/or to report the measurement to the RAN (e.g., a network node, particularly the serving cell), e.g., in the step 206.

The cell search is also a type of measurement 204. Any of the synchronization signals used for the detecting 202 may also be used for the measurement. For example, the steps 202 and 204 may be combined.

Preferably, the neighbor cell measurement method 200 is performed in all Radio Resource Control (RRC) states, e.g., in RRC idle state and RRC connected state. In RRC connected state, the measurement method 200 may be used by the UE 100 for one or more tasks such as for reporting the results to the network node (e.g., the serving cell). In RRC idle state, the measurement method 200 may be used by the UE 100 for one or more tasks such as for cell selection, cell reselection, etc.

In any embodiment, the measurement signals may comprise a resynchronization signal (RSS). For example, the measurement signal from at least one of the detected neighbor cells may be an RSS transmitted from the respective cell.

The RSS may be implemented according to 3GPP LTE-MTC Release 15 (introducing the resynchronization signal, RSS) or later. For example, the 3GPP Release 16 Work Item Description (WID) of Additional MTC enhancements for LTE states that (wherein BL refers to Bandwidth-reduced Low-complexity and CE refers to Coverage Enhancement) states:

The objective is to specify the following set of improvements for machine-type communications for BL/CE UEs.

[ . . . ]

Mobility enhancement:

Consider improving the DL RSRP and, if needed, RSRQ measurement accuracy, through use of RSS [RAN1, RAN4, RAN2]

Figure 3:
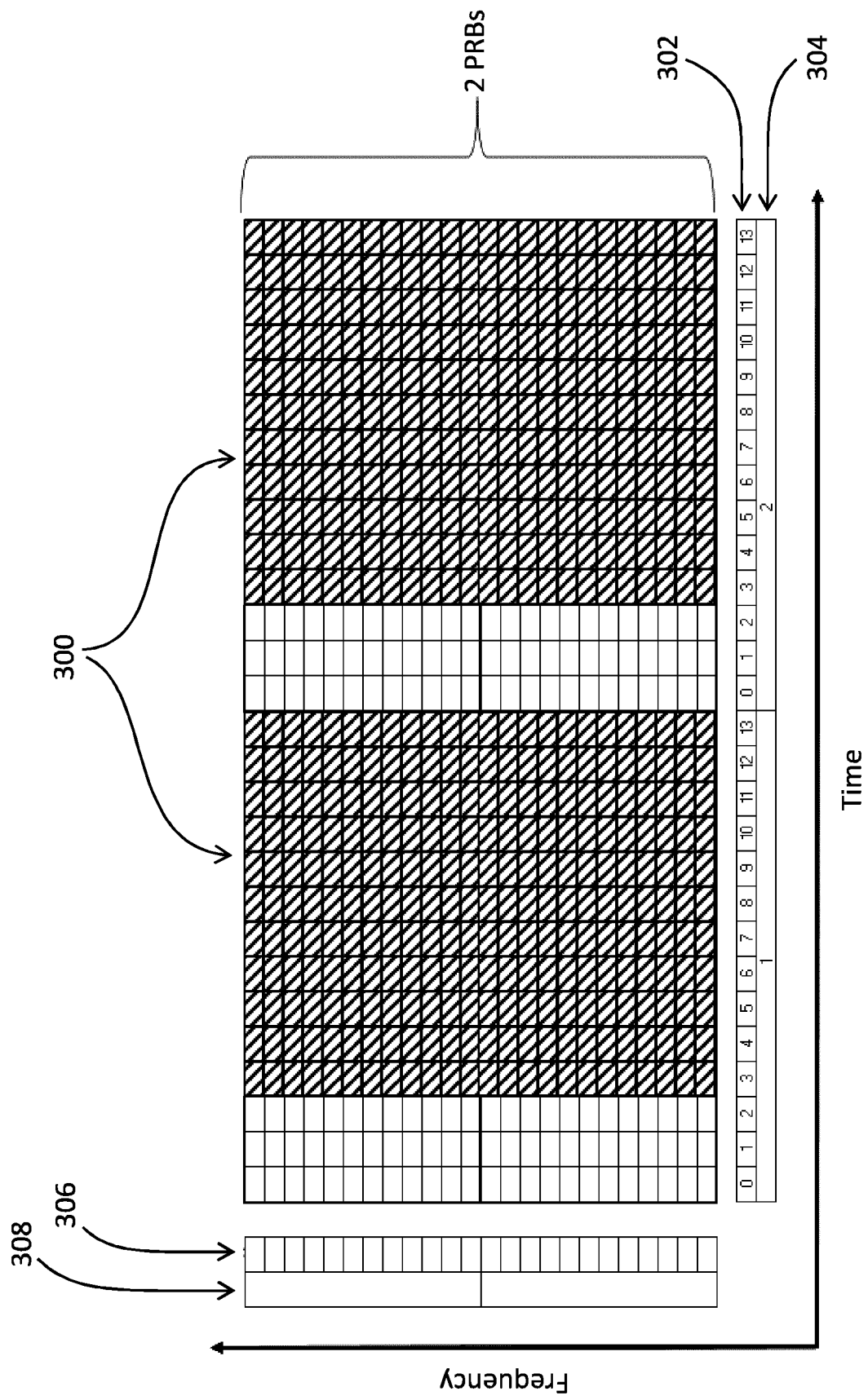
FIG. 3 schematically illustrates an example of a measurement signal, which may be usable in any embodiment of the device of FIG. 1 and the method of FIG. 2.

FIG. 3 schematically illustrates an example of a Time-Frequency Grid of the RSS as an example of the measurement signal 300 for implementing the technique.

Time is plotted on the horizontal axis. More specifically, an index 302 of an orthogonal frequency division multiplexing (OFDM) symbol within a slot and slot number 304 within REs of the RSS 300 define the temporal resources of the RSS 300.

Frequency is plotted on the vertical axis of FIG. 3. More specifically, subcarriers 306 and resource blocks 308 (or physical resource blocks, PRBs, each comprising 12 subcarriers) define the frequency resources of the RSS 300. The RSS 300 spans 2 PRBs 308.

The resynchronization signal (RSS) 300 is an example of the measurement signal that may further assist UEs 100 in poor coverage to achieve network synchronization. This is achieved by providing substantial synchronization energy over a short time interval. For example, the RSS 300 is allocated to the 11 contiguous symbols in a subframe, spanning only 2 PRBs in the frequency domain, although LTE-MTC typically use 6 PRB bandwidth (BW). The reason for the smaller BW is to decrease a detection complexity of the UE 100.

Both the duration and the periodicity of the RSS 300 may be configurable. For example, the RSS 300 may take durations of 8 ms to 40 ms and/or periods of 160 ms to 1280 ms.

An existing data structure for a configuration of the RSS 300 from the 3GPP document TS 36.331 (e.g., version 15.7.0, clause 6.3.2 on "Radio resource control information elements") is presented below (using Abstract Syntax Notation One or ASN.1).

```
-- ASN1START
RSS-Config-r15 ::=   SEQUENCE {
    duration-r15        ENUMERATED {sf8, sf16, sf32, sf40},
    freqLocation-r15    INTEGER (0..98),
    periodicity-r15     ENUMERATED {ms160, ms320, ms640, ms1280},
    powerBoost-r15      ENUMERATED {dB0, dB3, dB4dot8, dB6},
    timeOffset-r15      INTEGER (0..31)
}
-- ASN1STOP
```

The fields of the configuration parameter RSS-Config may be defined as indicated according to the below table.

| RSS-Config field descriptions |
| --- |
| Duration |
| Duration of RSS in subframes. Value sf8 corresponds to 8 subframes, value sf16 corresponds to 16 subframes and so on. |
| freqLocation |
| Frequency location (lowest PRB number) of RSS. |
| periodicity |
| Periodicity of RSS. Value ms160 corresponds to 160 ms, value ms320 corresponds to 320 ms and so on. |
| powerBoost |
| Power offset of RSS relative to CRS in dB. Value dB0 corresponds to 0 dB, value dB3 corresponds to 3 dB, value dB4dot8 corresponds to 4.8 dB and so on. |

| RSS-Config field descriptions |
| --- |
| timeOffset
Time offset of RSS in frames. The actual value of time offset is based on the value of duration, as follows:
For duration 160 ms, only value range 0 to 15 are applicable. Actual value = timeOffset * 1 frames.
For duration 320 ms, actual value = timeOffset * 1 frames.
For duration 640 ms, actual value = timeOffset * 2 frames.
For duration 1280 ms, actual value = timeOffset * 4 frames. |

An example of a physical layer (PHY) implementation of the RSS is defined in the 3GPP document TS 36.211 (e.g., version 15.7.0, subclause 6.11.3).

It may be possible to use RSS also for UEs in RRC_CONNECTED.

In addition to the above, also the cell id (e.g., PCI) and the antenna port configuration may need signaling, since measurements are depending on a relation in terms of energy or power between the RSS and CRS.

The technique may be implemented in consistency with recent agreements in 3GPP RAN1, e.g., using:

For each neighbor cell in the Neighbor Cell List:
Use 3 bits to signal a RSS Power Bias relative to $Q_{offset}$, where 1 state is used to indicate that RSS is not used for that neighbor cell.

Herein, $Q_{offset}$ may be used to adjust the measured value of CRS, e.g., in the step 206, based on different configurations. For example, different cells may employ different levels of CRS power boosting in order to provide different coverage among the cells. Measuring on cells with different power boosting values will not provide a correct representation of the reception quality of that cell. Hence, $Q_{offset}$ may be used in the step 206 to allow the UE 100 to compensate for such differences among cells in the NCL.

Alternatively or in addition, $Q_{offset}$ may be used or defined according to Section 5.2.3.2 in the 3GPP document TS 36.304 (e.g., version 15.4.0).

The technique may further deal with the case when the RSS is used as the measurement signal for such neighbor cell measurements according to the method 200. In that case, the RSS measured value (e.g., the power or energy of the RSS) measured in the step 204 should be compensated in the step 206, e.g., to compare among different cells wherein RSS is used for the neighbor cell measurements and/or to compare with cells (e.g., other neighbor cells or the serving cell) wherein CRS is used as the measurement signal.

In an embodiment, which is combinable with any other embodiment, the RSS neighbor cell measurements will be performed such that the UE 100 measures the power of the RSS (as the measurement signal) of the neighbor cell in the step 204, and compensates for the measured RSS power in the step 206 using the RSS power bias and/or the $Q_{offset}$, e.g., to obtain a comparable power estimate of the neighbor cell in the step 206.

In an embodiment, which is combinable with any other embodiment, in addition to knowing a time-frequency location of RSSs for different cells, in order to measure the power level, the UE needs also to know the RSS power level of the measured cells. In 3GPP RAN1 meeting #98bis, it was agreed that for cells in the neighbor cell list, a 3-bit power level indicator will be used for that. However, considering neighbor cell measurements typically do not rely on neighbor cell lists, and the dynamic range of RSS can vary substantially, depending on #CRS ports as well as CRS and RSS power boosting (see the 3GPP contribution R1-1909994), it is desirable that such an indicator is also included for cells not in the neighbor cell list.

Neighbor cell measurements with RSS may also be provided for cells not in the neighbor cell list.

In an embodiment, which is combinable with any other embodiment, for cells in the neighbor cell list, the 3-bit indicator may define a power bias for the RSS relative to the Q_offset value used for CRS-based measurements. In determining the indicator range, there may be two opposing properties to consider. Firstly, the higher the resolution, the more accurate the measurement, and secondly the lower the resolution, the larger the RSS power range.

A higher power resolution implies higher accuracy but a narrower range, and vice versa.

In the 3GPP contribution R1-1911356, it was proposed that the range of that indicator should be [−3:2:9] dB (i.e., abbreviation in mathlab code of the values of −3 dB, −1 dB, 1 dB, 3 dB, 5 dB, 7 dB and 9 dB). That would capture most of the useful RSS power range with an insignificant error. Assuming a slightly higher error, ±1½ dB, approximately corresponding to approximately an eighth of the expected variations from fading within a cell ($5^{th}$ percentile to $95^{th}$ percentile implies 11-12 dB difference), the range could be further extended to [−6:3:12] dB (i.e., abbreviation in mathlab code of the values of −3 dB, 0 dB, 3 dB, 6 dB, 9 dB and 12 dB). This would in practice cover the whole useful dynamic range.

For cells in the neighbor cell list, the RSS power bias relative to Q_offset may be [−6:3:12] dB.

The 3GPP document TS 36.213 (e.g., version 15.7.0) states the following regarding the energy per Resource Element (EPRE) of the RSS 300 in relation to a number of CRS ports and a CRS power boosting:

For a BL/CE UE, if the UE is configured with higher layer parameter RSS-Config, the ratio of resynchronization signal EPRE to cell-specific RS EPRE is given by higher layer parameter powerBoost in RSS-Config+10 $\log_{10}$ (p×min($\rho_A^d$, $\rho_B^d$)), where $\rho_A^d$ and $\rho_B^d$ are the default values for $\rho_A$ and $\rho_B$ in Table 5.2-1a assuming the same transmitted power for symbols with or without CRS, and p is the number of CRS ports.

The tables may be defined as follows.

TABLE 5.2-1

The cell-specific ratio $\rho_B/\rho_A$ for 1, 2, or 4 cell specific antenna ports

| | $\rho_B/\rho_A$ | |
| --- | --- | --- |
| $P_B$ | One Antenna Port | Two and Four Antenna Ports |
| 0 | 1 | 5/4 |
| 1 | 4/5 | 1 |

TABLE 5.2-1-continued

The cell-specific ratio $\rho_B/\rho_A$ for
1, 2, or 4 cell specific antenna ports

| $P_B$ | $\rho_B/\rho_A$ | |
|---|---|---|
| | One Antenna Port | Two and Four Antenna Ports |
| 2 | 3/5 | 3/4 |
| 3 | 2/5 | 1/2 |

TABLE 5.2-1a $\rho_A^d$ and $\rho_B^d$ for 1, 2, or 4 cell specific antenna ports assuming
the same transmitted power for symbols with or without CRS

| | One Antenna Port | | Two and Four Antenna Ports | |
|---|---|---|---|---|
| $P_B$ | $\rho_A^d$ | $\rho_B^d$ | $\rho_A^d$ | $\rho_B^d$ |
| 0 | 1 | 1 | 1 | 5/4 |
| 1 | 1/2 | 2/5 | 1/2 | 1/2 |
| 2 | 1/3 | 1/5 | 1/3 | 1/4 |
| 3 | 1/4 | 1/10 | 1/4 | 1/8 |

The technique may be implemented as a method 200 in a device 100, e.g., for comparing neighbor cell measurements among cells where some of the cells are included in an NCL whereas others are not. For example, in a step 202, the neighbor cells are detected. A set of cells in the NCL are identified together with a set of cells not in the NCL. In a step 204, measurements are performed on some (or all) of the detected cells where both sets of cells are represented. In a step 206, a radio signal value is estimated based on the measurements (e.g., for each of the measured cells).

Any one of the below seven embodiments may be implemented independently, in combination with one or more other embodiments of the below embodiments or in combination with any one of the embodiments in the enclosed list of embodiments.

In a first embodiment, the radio signal values for the cells in the NCL are adjusted with a bias value as provided in the NCL. For example, the NCL may comprise a bias value (e.g., for compensating a power bias in the transmit power of the measurement signal, particularly the RSS) for each of the listed neighbor cells.

In a second embodiment, an indicator transmitted in system information (SI) indicates to the radio device 100 that measurements 204 may or may not be performed on (e.g., individual) cells in the NCL. For example, the NCL may comprise a flag indicating that measurements 204 may or may not be performed for each of the listed neighbor cell. Alternatively or in addition, the indicator transmitted in system information (SI) indicates to the radio device 100 that measurements 204 may or may not be performed on cells not in the NCL.

Two different categories of cell environments may be identified. Firstly, in a majority of cells, configuration is coherent, i.e., neighbor cells are configured with little differences. Using RSS in this environment would result in reliable and relatively accurate measurements. Included in this category would be, e.g., networks comprising cells with both 2 and 4 CRS ports, or slightly different CRS power boosting. They would result in minor measurement errors that could at least partly be mitigated with the RSS power boosting parameter. Secondly, in a minority of cells, configuration is noncoherent, i.e., some neighbor cells, or the serving cells, may have deviating configurations. This environment may be found, e.g., if a cell has an extended coverage need compared to its neighbor cells by being deployed on the border between an urban and rural area. For this minority of cells, RSS may be ill suited for measurements.

To accurately use RSS for measurements on cells not in the NCL, it is necessary to control when that is allowed or not.

An indication in SI may be used to indicate if RSS may or may not be used for neighbor cell measurements on cells not in the NCL.

In a third embodiment, the signal values for cells not in NCL are adjusted with a priori cell data, e.g., from previously received cell SI of said cell or previously received neighbor cell information.

In a fourth embodiment, the radio signal values are adjusted with an average. The average may be to assume an average number of CRS ports, an average CRS power boosting and/or an average RSS power boosting when adjusting the measurement, and/or to adjust with the signal average itself, based on different hypotheses, e.g., regarding the number of CRS ports, the CRS power boosting and/or the RSS power boosting. By using an average value for the radio signal value instead of one of multiple possible values (e.g., according to one of the hypotheses), the error may be reduced and hence the measurement accuracy increases.

In a fifth embodiment, e.g., a variant or addition of the fourth embodiment, the set of an assumed number of CRS ports (i.e., the different hypotheses regarding the number of CRS ports) is adjusted based on received SI, e.g., if PresenceAntennaPort1 is set, the case (i.e., the hypothesis) of CRS ports being 1 may be excluded when computing the average.

In a sixth embodiment, the measurement signal on which measurements are performed is the RSS.

In a seventh embodiment, the radio signal values to measure and/or to estimate comprise RSRP or RSRQ.

In a variant of any of the embodiments, the bias value is set to that of the serving cell.

An example embodiment (e.g., using or combining any of the above embodiments) of a device 100 performs a measurement on a 2 CRS port cell and a 4 CRS port cell. The different numbers of CRS ports imply that a ratio between the power per CRS port and the actual received power will be twice as large for the 4 CRS port cell compared to the 2 CRS port case. Furthermore, the signal of each cell is received with a power at the device of 10 per CRS port, respectively. Neither of the cells are included in the NCL and the device has received PresenceAntennaPort1 such that the hypothesis that cells may have only 1 CRS port may be excluded.

In the example, the measured signal strength of the 2 CRS port cell is 10 and the measured signal strength on the 4 CRS port cell is 20 in the step 204. However, the device 100 does not know the number of CRS ports of either cell and must therefore make an assumption.

The below table presents the power estimates for the two cases based on the scaling factors in Table 5.2-1a in the 3GPP document TS 36.213.

TABLE 5.2-1a

| | Cell with 2 CRS ports | Cell with 4 CRS ports |
|---|---|---|
| Actual power per CRS port | 10 | 10 |
| Received power | 20 | 40 |

TABLE 5.2-1a-continued

|  | Cell with 2 CRS ports | Cell with 4 CRS ports |
| --- | --- | --- |
| Adjusted power per CRS port assuming 2 CRS ports | 10 | 20 |
| Adjusted power per CRS port assuming 4 CRS ports | 5 | 10 |
| Adjusted power per CRS port assuming 3 CRS ports | 7 | 13 |

From the above table, it is evident that the measurement error (e.g., 7−10=−3 for the neighboring cell with 2 CRS ports, and 13−10=+3 for the neighboring cell with 4 CRS ports) is averaged out over both neighboring cells when using the average number of CRS ports instead of using one of the actual numbers of CRS ports.

Hence, when comparing the two cells above with a cell that is in the NCL, the errors compared to that cell will be smaller than if the average number of CRS ports is not used. Assuming a cell in the NCL is also included, and the power per CRS port of that cell is measured and adjusted to 15, assuming 2 CRS ports for cells not in the NCL would result in the device 100 making the wrong selection of serving or camping cell, since the (wrongly) adjusted result for the 4 CRS port cell is 20, i.e., larger than 15.

Figure 4:
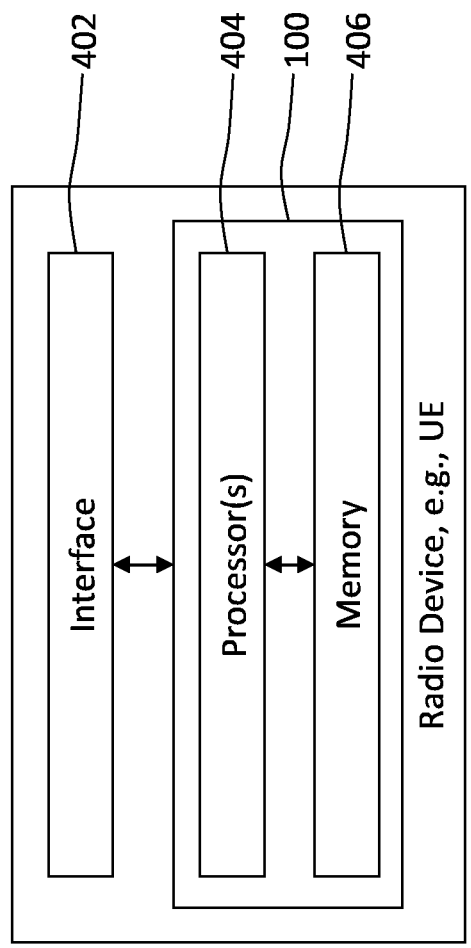
FIG. 4 shows a schematic block diagram of a further embodiment of the device of FIG. 1, FIG. 5 schematically illustrates a telecommunication network connected via an intermediate network to a host computer.

FIG. 4 shows a schematic block diagram for an embodiment of the device 100. The device 100 comprises one or more processors 404 for performing the method 200 and memory 406 coupled to the processors 404. For example, the memory 406 may be encoded with instructions that implement at least one of the modules 102, 104 and 106.

The one or more processors 404 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 406, radio device functionality and/or data receiver functionality. For example, the one or more processors 404 may execute instructions stored in the memory 406. Such functionality may include providing various features and steps discussed herein, including any of the benefits disclosed herein. The expression "the device being operative to perform an action" may denote the device 100 being configured to perform the action.

As schematically illustrated in FIG. 4, the device 100 may be embodied by a radio device or UE 400, e.g., functioning as a data receiver or data transmitter. The radio device 400 comprises a radio interface 402 coupled to the device 100 for radio communication with one or more radio devices and/or one or more base stations of the RAN.

As has become apparent from above description, embodiments of the technique provide a more accurate method for performing neighbor cell measurements, e.g., for the case of both cells in a NCL and cells not in the NCL being detected.

Same or further embodiments can, e.g. as a result of the increased accuracy and/or an increased number of measured cells, improve cell selection and/or system capacity in the RAN.

Figure 5:
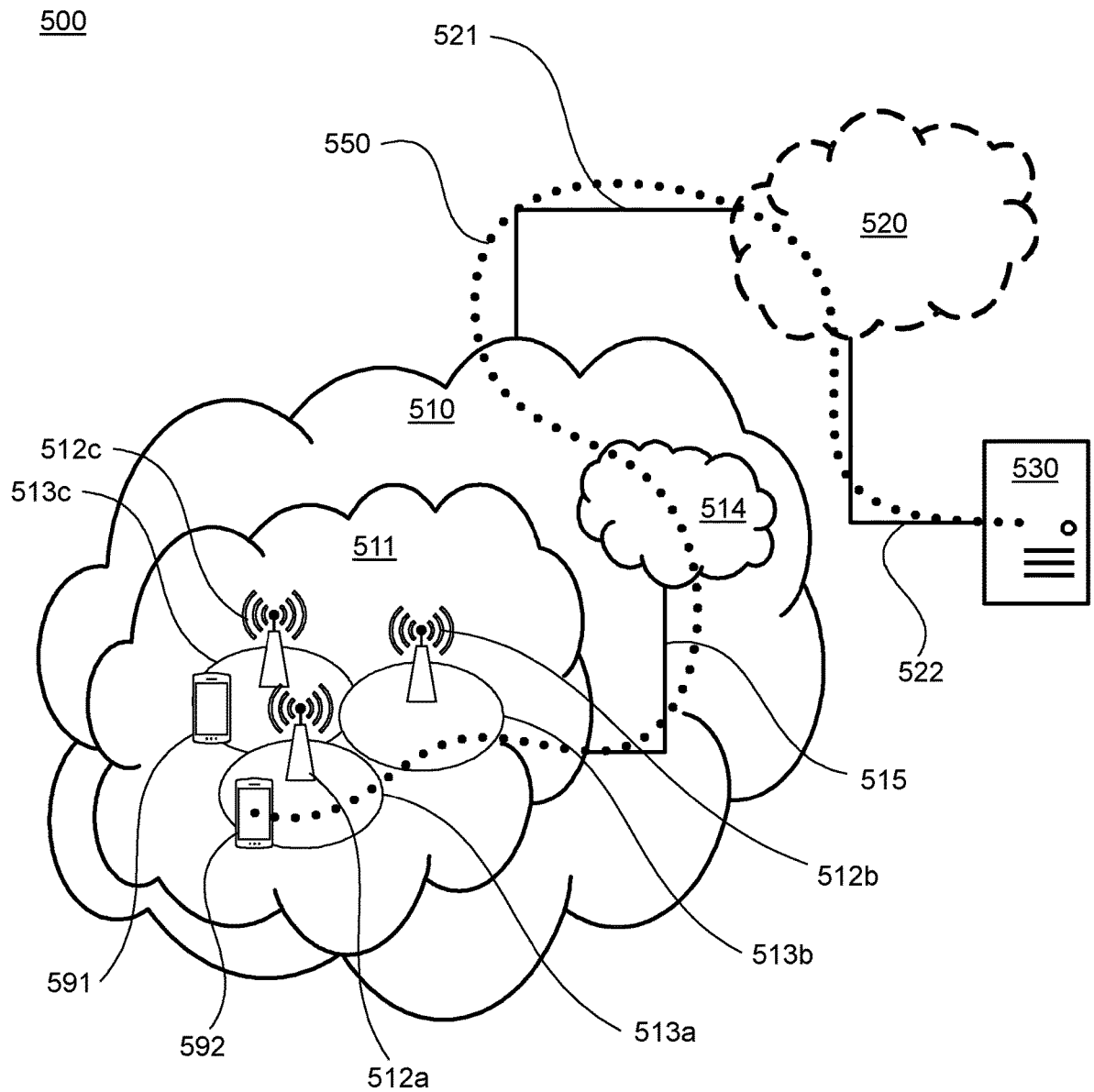

With reference to FIG. 5, in accordance with an embodiment, a communication system 500 includes a telecommunication network 510, such as a 3GPP-type cellular network, which comprises an access network 511, such as a radio access network, and a core network 514. The access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to the core network 514 over a wired or wireless connection 515. A first user equipment (UE) 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

The telecommunication network 510 is itself connected to a host computer 530, which may be embodied in the hardware and/or software of a standalone server, a cloud-implemented server, a distributed server or as processing resources in a server farm. The host computer 530 may be under the ownership or control of a service provider, or may be operated by the service provider or on behalf of the service provider. The connections 521, 522 between the telecommunication network 510 and the host computer 530 may extend directly from the core network 514 to the host computer 530 or may go via an optional intermediate network 520. The intermediate network 520 may be one of, or a combination of more than one of, a public, private or hosted network; the intermediate network 520, if any, may be a backbone network or the Internet; in particular, the intermediate network 520 may comprise two or more sub-networks (not shown).

The communication system 500 of FIG. 5 as a whole enables connectivity between one of the connected UEs 591, 592 and the host computer 530. The connectivity may be described as an over-the-top (OTT) connection 550. The host computer 530 and the connected UEs 591, 592 are configured to communicate data and/or signaling via the OTT connection 550, using the access network 511, the core network 514, any intermediate network 520 and possible further infrastructure (not shown) as intermediaries. The OTT connection 550 may be transparent in the sense that the participating communication devices through which the OTT connection 550 passes are unaware of routing of uplink and downlink communications. For example, a base station 512 may not or need not be informed about the past routing of an incoming downlink communication with data originating from a host computer 530 to be forwarded (e.g., handed over) to a connected UE 591. Similarly, the base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In a communication system 600, a host computer 610 comprises hardware 615 including a communication interface 616 configured to set up and maintain a wired or wireless connection with an interface of a different communication device of the communication system 600. The host computer 610 further comprises processing circuitry 618, which may have storage and/or processing capabilities. In particular, the processing circuitry 618 may comprise one or more programmable processors, application-specific integrated circuits, field programmable gate arrays or combinations of these (not shown) adapted to execute instructions. The host computer 610 further comprises software 611, which is stored in or accessible by the host computer 610 and executable by the processing circuitry 618. The software 611 includes a host application 612. The host application 612 may be operable to provide a service to a remote user, such as a UE 630 connecting via an OTT connection 650 terminating at the UE 630 and the host computer 610. In providing the service to the remote user, the host application 612 may provide user data which is transmitted using the OTT connection 650.

The communication system 600 further includes a base station 620 provided in a telecommunication system and comprising hardware 625 enabling it to communicate with the host computer 610 and with the UE 630. The hardware 625 may include a communication interface 626 for setting up and maintaining a wired or wireless connection with an interface of a different communication device of the communication system 600, as well as a radio interface 627 for setting up and maintaining at least a wireless connection 670 with a UE 630 located in a coverage area (not shown in FIG. 6) served by the base station 620. The communication interface 626 may be configured to facilitate a connection 660 to the host computer 610. The connection 660 may be direct or it may pass through a core network (not shown in FIG. 6) of the telecommunication system and/or through one or more intermediate networks outside the telecommunication system. In the embodiment shown, the hardware 625 of the base station 620 further includes processing circuitry 628, which may comprise one or more programmable processors, application-specific integrated circuits, field programmable gate arrays or combinations of these (not shown) adapted to execute instructions. The base station 620 further has software 621 stored internally or accessible via an external connection.

The communication system 600 further includes the UE 630 already referred to. Its hardware 635 may include a radio interface 637 configured to set up and maintain a wireless connection 670 with a base station serving a coverage area in which the UE 630 is currently located. The hardware 635 of the UE 630 further includes processing circuitry 638, which may comprise one or more programmable processors, application-specific integrated circuits, field programmable gate arrays or combinations of these (not shown) adapted to execute instructions. The UE 630 further comprises software 631, which is stored in or accessible by the UE 630 and executable by the processing circuitry 638. The software 631 includes a client application 632. The client application 632 may be operable to provide a service to a human or non-human user via the UE 630, with the support of the host computer 610. In the host computer 610, an executing host application 612 may communicate with the executing client application 632 via the OTT connection 650 terminating at the UE 630 and the host computer 610. In providing the service to the user, the client application 632 may receive request data from the host application 612 and provide user data in response to the request data. The OTT connection 650 may transfer both the request data and the user data. The client application 632 may interact with the user to generate the user data that it provides.

Figure 6:
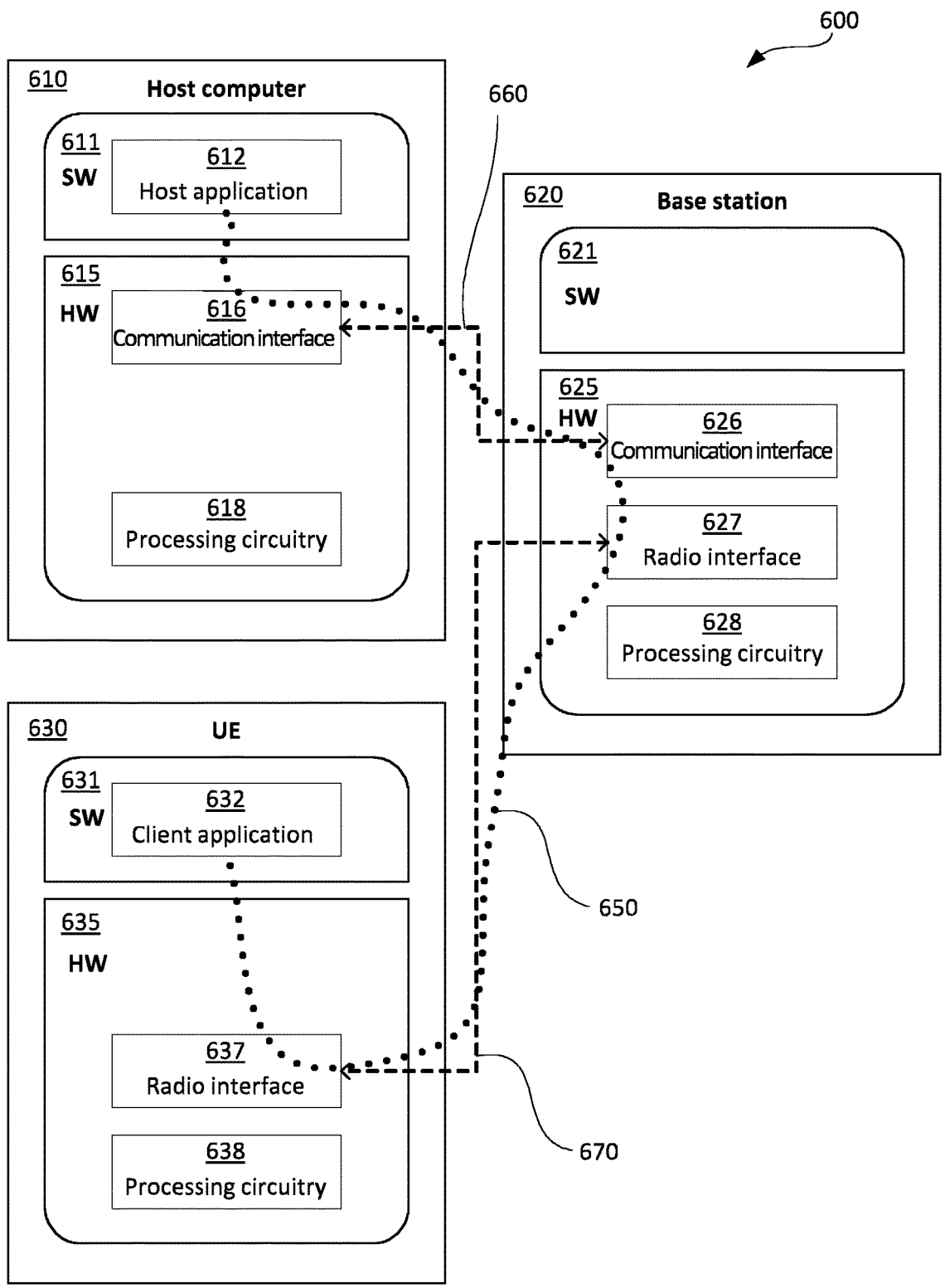
FIG. 6 shows a generalized block diagram of a host computer communicating via a base station with a user equipment over a partially wireless connection.

It is noted that the host computer 610, base station 620 and UE 630 illustrated in FIG. 6 may be identical to the host computer 530, one of the base stations 512*a*, 512*b*, 512*c* and one of the UEs 591, 592 of FIG. 5, respectively. This is to say, the inner workings of these entities may be as shown in FIG. 6 and independently, the surrounding network topology may be that of FIG. 5.

In FIG. 6, the OTT connection 650 has been drawn abstractly to illustrate the communication between the host computer 610 and the use equipment 630 via the base station 620, without explicit reference to any intermediary devices and the precise routing of messages via these devices. Network infrastructure may determine the routing, which it may be configured to hide from the UE 630 or from the service provider operating the host computer 610, or both. While the OTT connection 650 is active, the network infrastructure may further take decisions by which it dynamically changes the routing (e.g., on the basis of load balancing consideration or reconfiguration of the network).

The wireless connection 670 between the UE 630 and the base station 620 is in accordance with the teachings of the embodiments described throughout this disclosure. One or more of the various embodiments improve the performance of OTT services provided to the UE 630 using the OTT connection 650, in which the wireless connection 670 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 650 between the host computer 610 and UE 630, in response to variations in the measurement results. The measurement procedure and/or the network functionality for reconfiguring the OTT connection 650 may be implemented in the software 611 of the host computer 610 or in the software 631 of the UE 630, or both. In embodiments, sensors (not shown) may be deployed in or in association with communication devices through which the OTT connection 650 passes; the sensors may participate in the measurement procedure by supplying values of the monitored quantities exemplified above, or supplying values of other physical quantities from which software 611, 631 may compute or estimate the monitored quantities. The reconfiguring of the OTT connection 650 may include message format, retransmission settings, preferred routing etc.; the reconfiguring need not affect the base station 620, and it may be unknown or imperceptible to the base station 620. Such procedures and functionalities may be known and practiced in the art. In certain embodiments, measurements may involve proprietary UE signaling facilitating the host computer's 610 measurements of throughput, propagation times, latency and the like. The measurements may be implemented in that the software 611, 631 causes messages to be transmitted, in particular empty or "dummy" messages, using the OTT connection 650 while it monitors propagation times, errors etc.

Figures 7, 8:
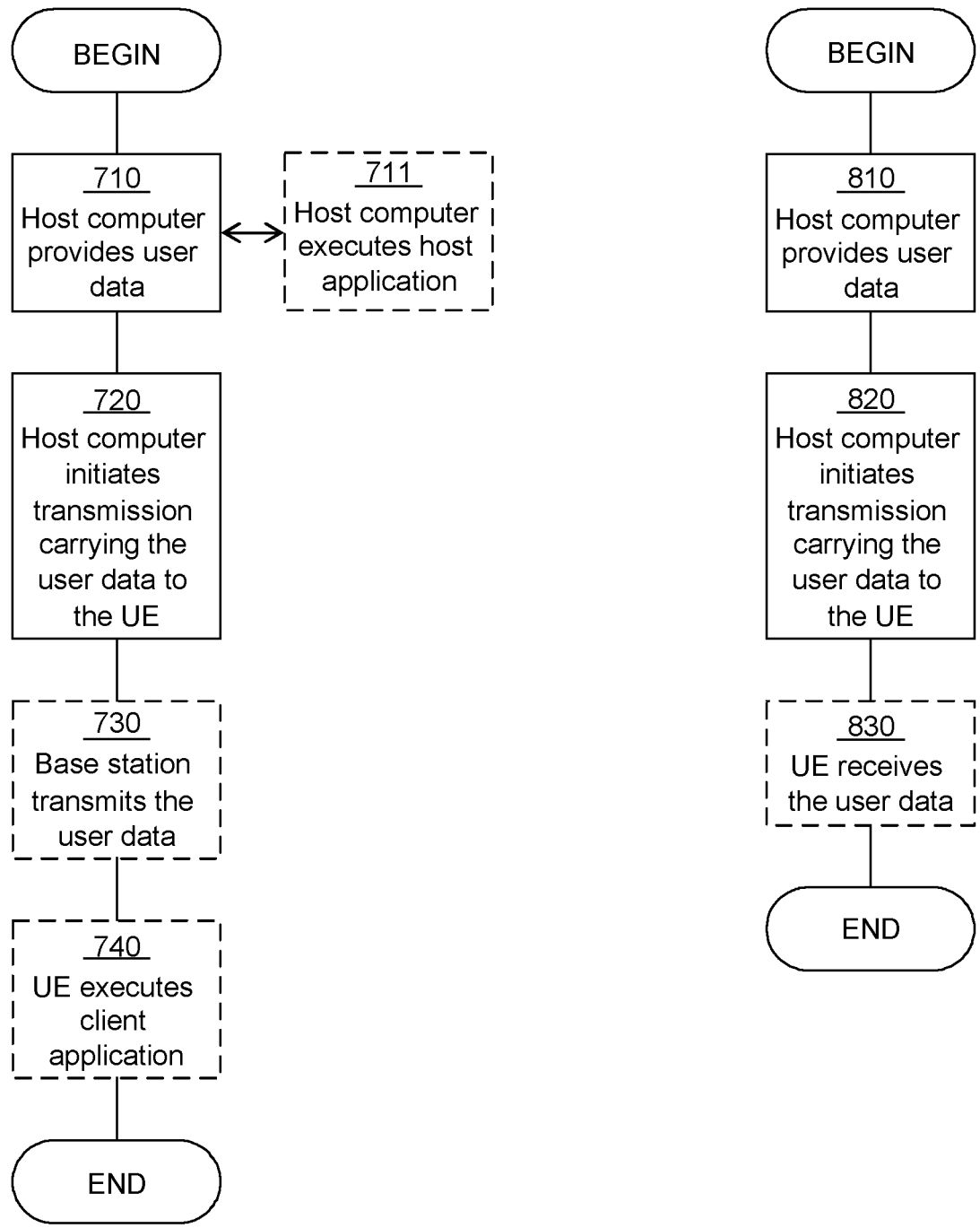
FIGS. 7 and 8 show flowcharts for methods implemented in a communication system including a host computer, a base station and a user equipment.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In a first step 710 of the method, the host computer provides user data. In an optional substep 711 of the first step 710, the host computer provides the user data by executing a host application. In a second step 720, the host computer initiates a transmission carrying the user data to the UE. In an optional third step 730, the base station transmits to the UE the user data which was carried in the transmission that the host computer initiated, in accordance with the teachings of the embodiments described throughout this disclosure. In an optional fourth step 740, the UE executes a client application associated with the host application executed by the host computer.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In a first step 810 of the method, the host computer provides user data. In an optional substep (not shown) the host computer provides the user data by executing a host application. In a second step 820, the host computer initiates a transmission carrying the user data to the UE. The transmission may pass via the base station, in accordance with the teachings of the embodiments described throughout this disclosure. In an optional third step 830, the UE receives the user data carried in the transmission.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention may be implemented according to any of the embodiments in the enclosed claims.

Detailed Variations of Embodiments

Title: Use of RSS for Measurement Improvements in LTE-MTC

---

1 Introduction
In the Rel-16 WID, one of the objectives is to introduce mobility enhancements by using RSS for measurements [1].
  Mobility Enhancement:
    • Consider improving the DL RSRP and, if needed, RSRQ measurement accuracy, through use of RSS [RAN1, RAN4, RAN2]
With respect to the above objective, the following agreements and working assumptions were made in RAN1 #98bis [2].
  The RSS Frequency Location function is as follows:
    • Possible RSS Frequency Locations can only be within legacy Rel-13 narrowbands
    • A RSS Frequency Location does not span two narrowbands.
    • In each legacy narrowband, there are 3 non-overlapping RSS Frequency Locations
    • Network can configure a subset of narrowbands to contain possible RSS
      ○ The subset of narrowbands is common across all cells in the network
      ○ The total number of selected narrowbands that can contain possible RSS is $N_{NB}$
    • The RSS Frequency Location function:
      ○ $I_{RSS}$ = PCID MOD ($3N_{NB}$)
        Where $I_{RSS}$ is the index of possible RSS Frequency Location starting with the lowest location
For the configuration of the $N_{NB}$ narrowbands, following is supported
  • A bitmap to indicate the $N_{NB}$ narrowbands. The narrowbands belonging to the central 6 PRBs are excluded.
    ○ By default, all narrowbands, except for the narrowbands belonging to the central 6 PRBs, are selected
  • A one-bit indicator indicating RSS colocation (time and frequency domain) in all cells
For the RSS Time Offset $O_{RSS}$, the RSS time offset is distributed across $M_{RSS}$ as a function of PCID. The RSS Time Offset function is:
  • $O_{RSS} = \lfloor PCID/(3N_{NB}) \rfloor$ MOD $M_{RSS}$
    NOTE: Actual Time Offset (in SFN radio frames) = $O_{RSS} \times G_{RSS}$
Where, the granularity of each unit of $G_{RSS} = P_{RSS} / (10 \, M_{RSS})$, where $G_{RSS}$ is configurable and is common across all cells in the network
  • FFS: value for $G_{RSS}$
For each neighbor cell in the Neighbor Cell List:
  • Use 3 bits to signal a RSS Power Bias relative to Q_offset, where 1 state is used to indicate that RSS is not used for that neighbor cell. FSS the range
Use RSS of neighbor cells for measurement improvement in Connected Mode:
  • Signalling of RSS parameters for UE reported neighbor cells that are NOT in the Neighbor Cell List
    FFS: Handling of potential mismatch of UE measurement gaps and RSS periodicity
Introduce a time shift $\Delta_{RSS}$, within two consecutive $O_{RSS}$ steps, so that the actual time offset can be shifted by $\Delta_{RSS}$ radio frames, i.e.:
  • The Actual Time Offset = ($O_{RSS} \times G_{RSS}$) + $\Delta_{RSS}$
  • The value $\Delta_{RSS}$ can be determined by the UE from the $O_{RSS}$ of the serving cell

---

As stated in the objective, the objective is to use RSS for unspecified DL RSRP or RSRQ measurements. Serving cell measurements are already feasible and RAN4 has agreed that RSRP based measurement can be used for determining the CE mode needed for random access. RAN1's focus of the objective is to enable UEs to perform neighbor cell measurements with RSS, should RAN4 agree that is beneficial. For that reason, this contribution is written with a focus on neighbor cell measurements.

2 DISCUSSION 2.1 Timing Grid
RAN1 #98bis agreed that the relation between PCID and timing offset is $$O_{RSS} = \left\lfloor \frac{PCID}{3N_{NB}} \right\rfloor MOD \, M_{RSS}$$

wherein

-continued $$M_{RSS} = \frac{P_{RSS}}{10 G_{RSS}}.$$

What remains is to determine $G_{RSS}$ which is configurable. The RSS periodicity, PRss, affects the timing raster of the RSS in that 160 and 320 ms periodicities has a raster of 1 frame whereas 640 has a raster of 2 frames and 1280 4 frames. Naturally, the more grid points, in both time and frequency, the less RSS neighbor cell interference. Hence, as many different locations as possible is preferable. This assumes that there is some RSS neighbor cell interference in the first place, which seems not to be the case. Nevertheless, it is the foundation of the non-collocated RSS deployment and should therefore be considered.

Observation 1 More Timing Offsets May be Preferable from a Neighbor Cell Interference Perspective.

Considering an RSS starting point is at the start of a frame, and that the shortest RSS duration is less than a frame, a preferable minimum grid is one frame for the cases where that is possible. For longer RSS periodicities, however, the Rel-15 time offset raster is longer than that. For these cases the minimum grid sizes within the allowed time offset raster should instead be selected. In order to do so, $G_{RSS}$ will need to depend on the periodicity.

Observation 2 the Minimum Grid of 1 Frame is Sufficient to Fit the Shortest RSS Duration without Overlap.

However, to that there are some further constraints that need to be considered. According to previous agreements, it should be possible to use RSS also for UEs in RRC_CONNECTED. In order to do so, timing grids of 40 and 80 ms must be supported for all RSS periodicities. Hence, $G_{RSS}$ must be selected such that timing grids of 40 and 80 ms are supported for all RSS periodicities.

Observation 3 to Support RRC_CONNECTED, $G_{RSS}$ Must be Chosen Such that 40 ms and 80 ms Grids are Supported for all Periodicities.

Table 1 presents the values of $G_{RSS}$ that takes into account both the RRC_CONNECTED measurement gap periodicities and the RSS time offset raster. For all RSS periodicities, it is possible to define an RSS grid of both 40 ms and 80 ms in addition to having minimal grids allowing for minimal RSS intercell interference.

TABLE 1

Proposed values of $G_{RSS}$ for different RSS periodicities.

| | $P_{RSS}$ = 160 ms | | | | $P_{RSS}$ = 320 ms | | | | $P_{RSS}$ = 640 ms | | | | $P_{RSS}$ = 1280 ms | | | |
|---|---|---|---|---|---|---|---|---|---|---|---|---|---|---|---|---|
| $G_{RSS}$ | 1 | 2 | 4 | 8 | 1 | 2 | 4 | 8 | 2 | 4 | 8 | 16 | 4 | 8 | 16 | 32 |
| $M_{RSS}$ | 16 | 8 | 4 | 2 | 32 | 16 | 8 | 4 | 32 | 16 | 8 | 4 | 32 | 16 | 8 | 4 |

Proposal 1 $G_{RSS}$ is Determined Based on RSS Periodicity According to:

| | |
|---|---|
| $P_{RSS}$ = 160 and 320 ms: | $G_{RSS}$ = 1, 2, 4 and 8, |
| $P_{RSS}$ = 640 ms: | $G_{RSS}$ = 2, 4, 8 and 16, and |
| $P_{RSS}$ = 1280 ms: | $G_{RSS}$ = 4, 8, 16 and 32. |

2.2 RSS Power Information

In addition to knowing the time-frequency location of RSSs for different cells, in order to measure the power level, the UE needs also to know the RSS power level of the measured cells. In RAN1 #98bis, it was agreed that for cells in the neighbor cell list, a 3-bit power level indicator will be used for that. However, considering neighbor cell measurements typically do not rely on neighbor cell lists, and the dynamic range of RSS can vary substantially, depending on #CRS ports as well as CRS and RSS power boosting [3], it is desirable that such an indicator is also included for cells not in the neighbor cell list.

Proposal 2 Provision for Neighbor Cell Measurements with RSS Also for Cells not in the Neighbor Cell List.

For cells in the neighbor cell list, the 3-bit indicator will define a power bias for the RSS relative to the Q_offset value used for CRS-based measurements. In determining the indicator range, there are two opposing properties to consider:

1. The higher the resolution, the more accurate the measurement, and
2. The lower the resolution, the larger the RSS power range.

Observation 4 a Higher Power Resolution Implies Higher Accuracy but a Narrower Range, and Vice Versa.

In [4], it was proposed that the range of that indicator should be [−3:2:9] dB. That would capture most of the useful RSS power range with an insignificant error. Assuming a slightly higher error, ±1½ dB, approximately corresponding to approximately an eighth of the expected variations from fading within a cell ($5^{th}$ percentile to $95^{th}$ percentile implies 11-12 dB difference), the range could be further extended to [−6:3:12]. This would in practice cover the whole useful dynamic range.

Proposal 3 for Cells in the Neighbor Cell List, the RSS Power Bias Relative to Q_Offset is [−6:3:12] dB.

For cells not in the neighbor cell list, so far there is no agreement on how to manage different configurations that may impact RSS measurements. Here, two different categories of cell environments may be identified:

1. In a majority of cells, configuration is coherent, i.e., neighbor cells are configured with little differences. Using RSS in this environment would result in reliable and relatively accurate measurements. Included in this category would be, e.g., networks comprising cells with both 2 and 4 CRS ports, or slightly different CRS power boosting. They would result in minor measurement errors that could at least partly be mitigated with the RSS power boosting parameter.
2. In a minority of cells, configuration is noncoherent, i.e., some neighbor cells, or the serving cells, may have deviating configurations. This environment may be found, e.g., if a cell has an extended coverage need compared to its neighbor cells by being deployed on the border between an urban and rural area. For this minority of cells, RSS may be ill suited for measurements.

From the above we make the conclusion that, to accurately use RSS for measurements on cells not in the neighbor cell list, it is necessary to control when that is allowed or not.

Proposal 4 Indicate in SI if RSS May or May not be Used for Neighbor Cell Measurements on Cells not in the Neighbor Cell List.

A secondary priority is to provide a bias term corresponding to the one agreed for cells in the neighbor cell list. However, transmitting such a bias term will be more difficult since it assumes that all surrounding cells share the same configuration and that the serving cell is the only outlier. This is an unrealistic and likely not very frequent situation. The most common environment is likely that networks mix cells with 2 and 4 CRS ports. (We deliberately omit the 1 CRS port case since that is deemed to be very infrequent.) Since the UE will not know if its neighbor cells have 2 or 4 CR5 ports, there will be a systematic measurement error of ±3 dB compared to its serving cell for which it knows the number of CRS ports or compared to cells in the neighbor cell list. However, there is a simple and effective way to reduce the measurement error if the UE instead assumes 3 CRS ports for cells not in the neighbor cell list. This way, the measurement error may be halved to approximately 1.5 dB instead, well within the error margin. Alternatively, the RSS-based measurement may be derived by using an average of the measurement result from using both 2 and 4 CR5 ports. For the rare situation where cells with only 1 CRS port exists, the UE may identify this from the PresenceAntennaPort1 IE in SI.

Proposal 5 for Cells not in the Neighbor Cell List, the UE can Assume 3 CRS Ports when Performing Measurements or Use the Average Power from Assuming 2 or 4 CRS Ports, for Measurements on RSS if PresenceAntennaPort1 is Set.

2.3 Additional Neighbor Cell List Information

In addition to the RSS time and frequency location that are made dependent on the cell id, RSS periodicity that is carrier specific and various parameters affecting the RSS power level, it remains to agree on whether the RSS duration should also be included or not. Including it would allow the UE to avoid hypothesizing the four different sequences that result from the four different durations. However, considering that the UE is synchronized towards its serving cell, and presumably knows the time offsets among cells, hypothesizing among four hypotheses is marginal compared to hypothesizing among a continuous range of time and frequency samples which is the case when a UE wakes up from an extended sleep period. Hence, we propose not to include RSS duration in the neighbor cell list.

Proposal 6 RSS Duration is not Included in the Neighbor Cell List.

3 CONCLUSION

In the previous sections we made the following observations:
  Observation 1 More timing offsets may be preferable from a neighbor cell interference perspective.
  Observation 2 The minimum grid of 1 frame is sufficient to fit the shortest RSS duration without overlap.
  Observation 3 To support RRC_CONNECTED, $G_{RSS}$ must be chosen such that 40 ms and 80 ms grids are supported for all periodicities.
  Observation 4 A higher power resolution implies higher accuracy but a narrower range, and vice versa.

Based on the discussion in the previous sections we propose the following:
  Proposal 1 $G_{RSS}$ is determined based on RSS periodicity according to:

| | |
|---|---|
| $P_{RSS}$ = 160 and 320 ms: | $G_{RSS}$ = 1, 2, 4 and 8, |
| $P_{RSS}$ = 640 ms: | $G_{RSS}$ = 2, 4, 8 and 16, and |
| $P_{RSS}$ = 1280 ms: | $G_{RSS}$ = 4, 8, 16 and 32. |

Proposal 2 Provision for neighbor cell measurements with RSS also for cells not in the neighbor cell list.
  Proposal 3 For cells in the neighbor cell list, the RSS power bias relative to Q_offset is [−6:3:12] dB.
  Proposal 4 Indicate in SI if RSS may or may not be used for neighbor cell measurements on cells not in the neighbor cell list.
  Proposal 5 For cells not in the neighbor cell list, the UE can assume 3 CRS ports when performing measurements or use the average power from assuming 2 or 4 CRS ports, for measurements on RSS if PresenceAntennaPort1 is set.
  Proposal 6 RSS duration is not included in the neighbor cell list.

REFERENCES

[1] RP-191356, "Revised WID: Additional MTC enhancements for LTE," Ericsson, RAN #84, Newport Beach, USA, June 2019.
[2] R1-1911573, "RAN1 agreements for Rel-16 Additional MTC Enhancements for LTE," Ericsson, RAN1. #98bis, Chongqing, P.R. China, October 2019.
[3] R1-1909994, "Use of RSS for measurement improvements in LTE-MTC," Ericsson, RAN1 #98bis, Chongqing, P.R. China, October 2019.
[4] R1-1911356, "Measurements based on RSS," Qualcomm Inc., RAN1 #98bis, Chongqing, P.R. China, October 2019.

The invention claimed is:

1. A method of performing neighbor cell measurements for one or more cells of a cellular radio access network (RAN), the method being implemented in a radio device wirelessly connected to or connectable to the RAN, the method comprising:
  detecting at least two neighbor cells of the RAN, wherein the detected neighbor cells are neighbor cells relative to at least one of the radio device and a serving cell of the radio device, wherein at least one of the detected neighbor cells is in a neighbor cell list (NCL) of the RAN, and wherein at least one of the detected neighbor cells is not in the NCL of the RAN;
  receiving an NCL control message from the RAN;
  measuring, for each of one or more of the detected neighbor cells of the RAN, a resynchronization signal (RSS) from the respective cell; and
  estimating, for each of the one or more of the detected neighbor cells of the RAN, a radio signal value based on the RSS from the respective cell;
  wherein the NCL control message indicates to include the at least one detected neighbor cell not in the NCL in at least one of the measuring and the estimating.

2. The method of claim 1, wherein:
  the estimating comprises estimating the respective radio signal value for the at least one detected neighbor cell not in the NCL based on data from the serving cell;
  the estimating of the respective radio signal value for the at least one detected neighbor cell not in the NCL based on data from the serving cell comprises compensating a power bias in a transmit power; and
  the power bias is assumed to be equal to a power bias of the serving cell.

3. The method of claim 1, wherein:
  a transmit power of the RSS from at least one of the detected neighbor cells involves a power bias; and
  estimating the radio signal values comprises compensating the power bias.

4. The method of claim 3, further comprising receiving a power bias control message from the RAN, the power bias control message being indicative of the power bias.

5. The method of claim 3, wherein the power bias relates to or is caused by at least one of a boost in the transmit power of the respective RSS and a number of reference signal (RS) ports of the respective RSS.

6. The method of claim 1, further comprising receiving a control message from the RAN, wherein:
the control message indicates a first power bias used by a first detected neighbor cell for transmitting RSSs;
the control message does not indicate a second power bias used by a second detected neighbor cell for transmitting RSSs; and
the second detected neighbor cell is excluded from at least one of the measuring and the estimating.

7. The method of claim 1, further comprising transmitting a report to the RAN, the report being indicative of the radio signal value estimated for each of the one or more of the detected neighbor cells of the RAN.

8. The method of claim 1, wherein estimating, for at least one of the detected neighbor cells in the NCL, the radio signal value based on the RSS from the respective cell comprises compensating a power bias indicated in the NCL for the at least one of the detected neighbor cells.

9. The method of claim 1, wherein system information (SI) from the RAN comprises the NCL control message.

10. The method of claim 1, performed in at least one of a radio resource control (RRC) connected state and an RRC idle state.

11. The method of claim 1, wherein the detecting comprises:
detecting a set of at least two neighbor cells;
identifying the at least one cell in the set of detected neighbor cells, which is in the NCL; and
identifying the at least one other cell in the set of detected neighbor cells, which is not in the NCL.

12. The method of claim 1, wherein the estimating comprises estimating the respective radio signal value for the at least one detected neighbor cell in the NCL relative to a result of measuring the respective cell according to a bias value signaled in the NCL.

13. The method of claim 1, wherein for cells in the NCL:
a 3-bit indicator defines an RSS power bias for the RSS relative to a Q_offset value used for cell-specific reference signal-based measurements; and
the RSS power bias relative to the Q_offset value is at least one of −6 dB, −3 dB, 0 dB, 3 dB, 6 dB, 9 dB, and 12 dB.

14. A device for performing neighbor cell measurements for one or more cells of a cellular radio access network (RAN), the device comprising:
at least one processor and a memory, the memory comprising instructions executable by the at least one processor, whereby the device is configured to:
detect at least two neighbor cells of the RAN, wherein the detected neighbor cells are neighbor cells relative to at least one of the device and a serving cell of the device, wherein at least one of the detected neighbor cells is in a neighbor cell list (NCL) of the RAN, and wherein at least one of the detected neighbor cells is not in the NCL of the RAN;
receive an NCL control message from the RAN;
measure, for each of one or more of the detected neighbor cells of the RAN, a resynchronization signal (RSS) from the respective cell; and
estimate, for each of the one or more of the detected neighbor cells of the RAN, a radio signal value based on the RSS from the respective cell;
wherein the NCL control message indicates to include the at least one detected neighbor cell not in the NCL in at least one of the measuring and the estimating.

15. The device of claim 14, wherein for cells in the NCL:
a 3-bit indicator defines a RSS power bias for the RSS relative to a Q_offset value used for CRS-based measurements; and
the RSS power bias relative to the Q_offset value is at least one of −6 dB, −3 dB, 0 dB, 3 dB, 6 dB, 9 dB, and 12 dB.

16. The device of claim 14, wherein:
the estimating comprises estimating the respective radio signal value for the at least one detected neighbor cell not in the NCL based on data from the serving cell;
the estimating of the respective radio signal value for the at least one detected neighbor cell not in the NCL based on data from the serving cell comprises compensating a power bias in a transmit power; and
the power bias is assumed to be equal to a power bias of the serving cell.

* * * * *